(12) United States Patent
Zayas (10) Patent No.: US 7,756,154 B2
(45) Date of Patent: Jul. 13, 2010

(54) SHARED IMPLEMENTATION FOR MULTIPLE SYSTEM INTERFACES

(75) Inventor: Edward Ramon Zayas, Milpitas, CA (US)

(73) Assignee: NetApp, Inc., Sunnyvale, CA (US)

( * ) Notice: Subject to any disclaimer, the term of this patent is extended or adjusted under 35 U.S.C. 154(b) by 946 days.

(21) Appl. No.: 11/088,631

(22) Filed: Mar. 22, 2005

(65) Prior Publication Data

US 2006/0215700 A1 Sep. 28, 2006

(51) Int. Cl.
*H04L 12/66* (2006.01)

(52) U.S. Cl. .................... 370/463; 370/474; 370/252; 707/102; 715/746; 715/762; 719/328

(58) Field of Classification Search ............... 370/474, 370/252, 254, 359, 381, 419, 463; 715/700, 715/744, 746, 762; 707/101, 102; 719/328
See application file for complete search history.

(56) References Cited

U.S. PATENT DOCUMENTS

| | | | |
|---|---|---|---|
| 5,606,702 A * | 2/1997 | Diel et al. ................ | 719/329 |
| 5,617,527 A | 4/1997 | Kressin et al. | |
| 5,774,720 A | 6/1998 | Borgendale et al. | |
| 5,867,686 A * | 2/1999 | Conner et al. ............... | 711/168 |
| 6,640,278 B1 | 10/2003 | Nolan et al. | |
| 6,983,303 B2 | 1/2006 | Pellegrino et al. | |
| 2002/0019908 A1 * | 2/2002 | Reuter et al. ............... | 711/112 |
| 2002/0083216 A1 | 6/2002 | Hickson et al. | |
| 2002/0174129 A1 * | 11/2002 | Aldrich et al. .............. | 707/101 |
| 2002/0184207 A1 * | 12/2002 | Anderson et al. ............. | 707/4 |
| 2002/0188592 A1 | 12/2002 | Leonhardt et al. | |
| 2002/0191619 A1 | 12/2002 | Shafer | |
| 2003/0225800 A1 | 12/2003 | Kavuri | |
| 2004/0019587 A1 * | 1/2004 | Fuh et al. ................... | 707/2 |
| 2004/0133718 A1 * | 7/2004 | Kodama et al. .............. | 710/74 |
| 2004/0214561 A1 * | 10/2004 | Date et al. .................. | 455/418 |
| 2004/0267766 A1 * | 12/2004 | Marek et al. ................ | 707/100 |
| 2005/0010620 A1 * | 1/2005 | Silvers et al. ............... | 707/205 |
| 2005/0033757 A1 | 2/2005 | Greenblatt et al. | |

(Continued)

FOREIGN PATENT DOCUMENTS

EP 1693757 8/2006

(Continued)

OTHER PUBLICATIONS

PCT International Search Report and Written Opinion for PCT/US2006/007785, Int'l. filing date Mar. 3, 2006, mailing date Aug. 8, 2006 (16 pages).

(Continued)

*Primary Examiner*—Kwang B Yao
*Assistant Examiner*—Nguyen Ngo
(74) *Attorney, Agent, or Firm*—Perkins Coie LLP (57) ABSTRACT

A shared implementation for multiple system interfaces. An embodiment of a method includes receiving a command for a system, the command being a command for one of a plurality of interfaces for the system; generating a data structure for the command, the data structure including an opcode from a common library; and parsing the command using one of a plurality of parsing functions, parsing of the command including inserting an argument from the command into the data structure for the command.

28 Claims, 7 Drawing Sheets

U.S. PATENT DOCUMENTS

| | | | |
|---|---|---|---|
| 2005/0060693 A1* | 3/2005 | Robison et al. | 717/143 |
| 2006/0063519 A1* | 3/2006 | Rajaram | 455/419 |
| 2006/0136368 A1* | 6/2006 | Young-Lai et al. | 707/2 |
| 2008/0263112 A1 | 10/2008 | Shaath et al. | |

FOREIGN PATENT DOCUMENTS

| | | |
|---|---|---|
| WO | WO 92/17838 | 10/1992 |

OTHER PUBLICATIONS

"Introduction to Data ONTAP 7G". Network Appliance, Inc. Oct. 2005, pp. 1-6.

"Network appliance powers up the storage grid-world's first dynamic virtualization engine". CIMdata PLM Industry Summary Online Archive. Cimdata Newsletter 2004. www.cimdata.com/newsletter.

Co-pending U.S. Appl. No. 11/118,224 filed Apr. 28, 2005.

Notice of Allowance mailed Jan. 28, 2010 in Co-pending U.S. Appl. No. 11/118,224 filed Apr. 28, 2005.

Final Office Action mailed Feb. 19, 2009 in Co-pending U.S. Appl. No. 11/118,224 filed Apr. 28, 2005.

Non-Final Office Action mailed Nov. 26, 2008 in Co-pending U.S. Appl. No. 11/118,224 filed Apr. 28, 2005.

Non-Final Office Action mailed Aug. 26, 2008 in Co-pending U.S. Appl. No. 11/118,224 filed Apr. 28, 2005.

Final Office Action mailed May 13, 2008 in Co-pending U.S. Appl. No. 11/118,224 filed Apr. 28, 2005.

Non-Final Office Action mailed Aug. 10, 2007 in Co-pending U.S. Appl. No. 11/118,224 filed Apr. 28, 2005.

* cited by examiner

## SHARED IMPLEMENTATION FOR MULTIPLE SYSTEM INTERFACES

FIELD OF THE INVENTION

At least one embodiment of the present invention pertains to system interfaces, and more particularly to a method and apparatus for shared implementation for multiple system interfaces.

BACKGROUND

Complex systems utilize various interfaces for system control and management. Among such complex systems are storage servers, a storage server being a special-purpose processing system used to store and retrieve data on behalf of one or more client processing systems ("clients"). A storage server can be used for many different purposes, such as to provide multiple users with access to shared data or to backup mission critical data.

A file server is an example of a storage server that may be accessed using various interfaces. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). Another example of a storage server is a device that provides clients with block-level access to stored data, rather than file-level access, or a device that provides clients with both file-level access and block-level access. A client may use any of various interfaces to access the file server.

If a system utilizes multiple interfaces, each interface may provide a different method of interfacing with the system. For example, a storage system may utilize a command line interface, by which a user may directly input instructions for the storage system. In another example, a storage system may utilize an application programming interface (API). The multiple interfaces may provide differing commands and operations. The interfaces may have different names for the same basic function, or may express different functions. In conventional operations, each such interface is subject to a separate implementation. The need for separate implementation of each interface complicates the operation of the system and increases the difficulty in making any needed modifications or updates to the system.

SUMMARY OF THE INVENTION

An embodiment of the invention provides for shared implementation of multiple interfaces.

An embodiment of a method includes receiving a command for a system for one of a plurality of interfaces for the system. The method includes generating a data structure for the command. The data structure may include an opcode for the command from a common library. The method further includes parsing the command using one of a plurality of parsing functions, with parsing of the command including inserting an argument from the command into the data structure for the command.

An embodiment of a system includes a first interface to access the system and a second interface to access the system. The system further includes a common implementation to process commands for both the first interface and the second interface, and a common library to support the processing of commands for the first interface and the second interface.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for shared implementation for multiple system interfaces are described. As described in greater detail below, in certain embodiments of the invention a method includes providing a single implementation to support multiple interfaces to a system such as a storage server.

In one embodiment of the invention, a system such as a storage server supports multiple interfaces. The interfaces may have differences in command operations and other factors. In an embodiment, the multiple interfaces are supported by a shared implementation. In one possible embodiment, the system that is accessed via the multiple interfaces is a storage server.

A system may include interfaces such as, for example, a first interface that is a command line interface and a second interface that is an application programming interface (API). In this example, both the first interface and the second interface may be utilized to control or manage a system, which may include a storage server. The first interface may include a command line interface to a storage device produced by Network Appliance, Inc. The second interface may include the Zephyr API (ZAPI), a proprietary API of Network Appliance, Inc. In one example, an API, such as ZAPI, may provide for marshalling of API name and input parameters using XML (extensible markup language), with input parameters being typed and the contents of the XML being independent of the programming language and architecture on both client and server sides of a transaction, and with the server returning values from the invocation of the API marshaled in the same format as the input. In one embodiment, a command line interface is an interactive process with a user, while an API is generally a non-interactive interface.

Access to a system through an interface may include management of a system through a management console using simple network management protocol (SNMP). For example, a management console may use an API for the purpose of providing management of a system such as a storage server.

An embodiment of the invention may be implemented in various environments. The environments may include file storage such as NAS (network attached storage), block-based storage such as SAN (storage area network), or mixed SAN and NAS environments.

In one embodiment of the invention, a unified interface process is utilized for multiple types of operations. In one example, an interface process for a storage server may be utilized for commands relating to various types of data structures, such as volume structures and aggregate structures, which are more fully discussed in relation to FIG. 4. For example, a first interface and a second interface may each provide differing commands for creating, destroying, or modifying data structures of a storage server. The command names, arguments, and other requirements may vary for the interfaces. In one embodiment, a unified interface process supports the commands of both the first interface and the second interface. In addition to differences in the commands used, the interfaces may not support the same operations, and thus some types of commands will be supported in one interface and not in another.

Further, a first interface and a second interface may have different command structures to accomplish similar tasks. For example, to accomplish a certain task, a first system may issue a particular command, which may then call multiple functions or sub-commands to accomplish the task. A second system may instead utilize a number of commands to accomplish the same task. In one embodiment, a shared implementation supports the command structures of both interfaces.

In one embodiment of the invention, a shared or common library is provided to implement commands of multiple interfaces. The shared library supports the actual operations of all commands and provides a common set of operation codes (opcodes) for all command operations of the multiple interfaces.

In one embodiment of the invention, an interface implementation assigns one parsing function to each command of each supported interface. For example, for a first interface there may be one parsing function assigned for a command to create a structure, one parsing function for a command to delete a structure, and so on, with one parsing function also being assigned for each of the commands for a second interface. In one embodiment, a received command is recognized and a parsing function is called for the command. Certain data is passed to the parsing function regarding the command. The data includes a pointer to a data structure, or parsing structure, that is generated for the command being parsed.

In one embodiment of the invention, a command is entered into an interface, the interface being one of a number of different interfaces for a system. The command is initially evaluated to identity the command and the parsing function for the command. The command is parsed to determine, among other matters, what the instruction is, what elements are present in the instruction, and whether the correct number and type of elements are present. This may be represented by producing a parsing structure of the command. The parsing structure is then passed on to proceed with the operation of the command. The parsing structure is utilized to provide the input parameters and the output or status of the operation, such as an error code. If a command is legitimate and provides proper data, then after the parsing of the command there is action taken to accomplish the work that is represented by the command. The action to accomplish the work might entail calling a procedure. The procedure may be represented in a file system, such as the WAFL™ (Write Anywhere File Layout) file system of Network Appliance. The interface then performs a clean up after command execution to complete the operation.

In one embodiment of the invention, a plurality of interfaces to a system such as a storage server are implemented utilizing the following:

(1) A common set of operation codes (opcodes)—A common set of opcodes is provided, such as in a common library. The set of opcodes includes all of the operations that are used with any of the interfaces to the system. One or more opcodes may be used in less than all of the systems, and thus will be non-operational in the other systems. A certain command may represent one or more opcodes, depending on the structure of the operation.

(2) Access macros—One or more access macros or methods are provided to obtain information from entered commands. An access macro is not required to understand the command that is presented, but rather is only required to obtain the necessary information from the command. This information then may be used in preliminary operations to prepare for the parsing of the command. As used herein, an access macro or method is a macro, method, or other similar routine used to retrieve data.

(3) Common names for the operations—The multiple interfaces may have different names for certain operations. A common name or representation is provided for each operation such that each interface can map into the common name. A particular command may map into one or more of the common names depending on the command structure.

(4) Parsing method for each command—A set of parsing methods is provided to support all of the possible commands. An appropriate parsing method is assigned for each command of each of the interfaces. The parsing method for a command will parse the command and produce a parsing structure for the command type, thereby providing the operation or operations and arguments for the command. In one example, each parsing method may include the common opcode or opcodes for the operation, and a common parsing structure for the command.

(5) Implementation methods—Certain basic methods may be provided for the processing of a command. These methods may include (a) an initiation method to generate a basic data structure (which may be unified parsing structure containing a common parsing structure within it) and provide certain basic information in the data structure, (b) a parsing method to parse the command, which results in filling in the basic data structure with the argument information from the command (thereby completing the parsing structure for the command), and (c) a clean up method to eliminate any extraneous data references after command execution is completed.

Figure 1:
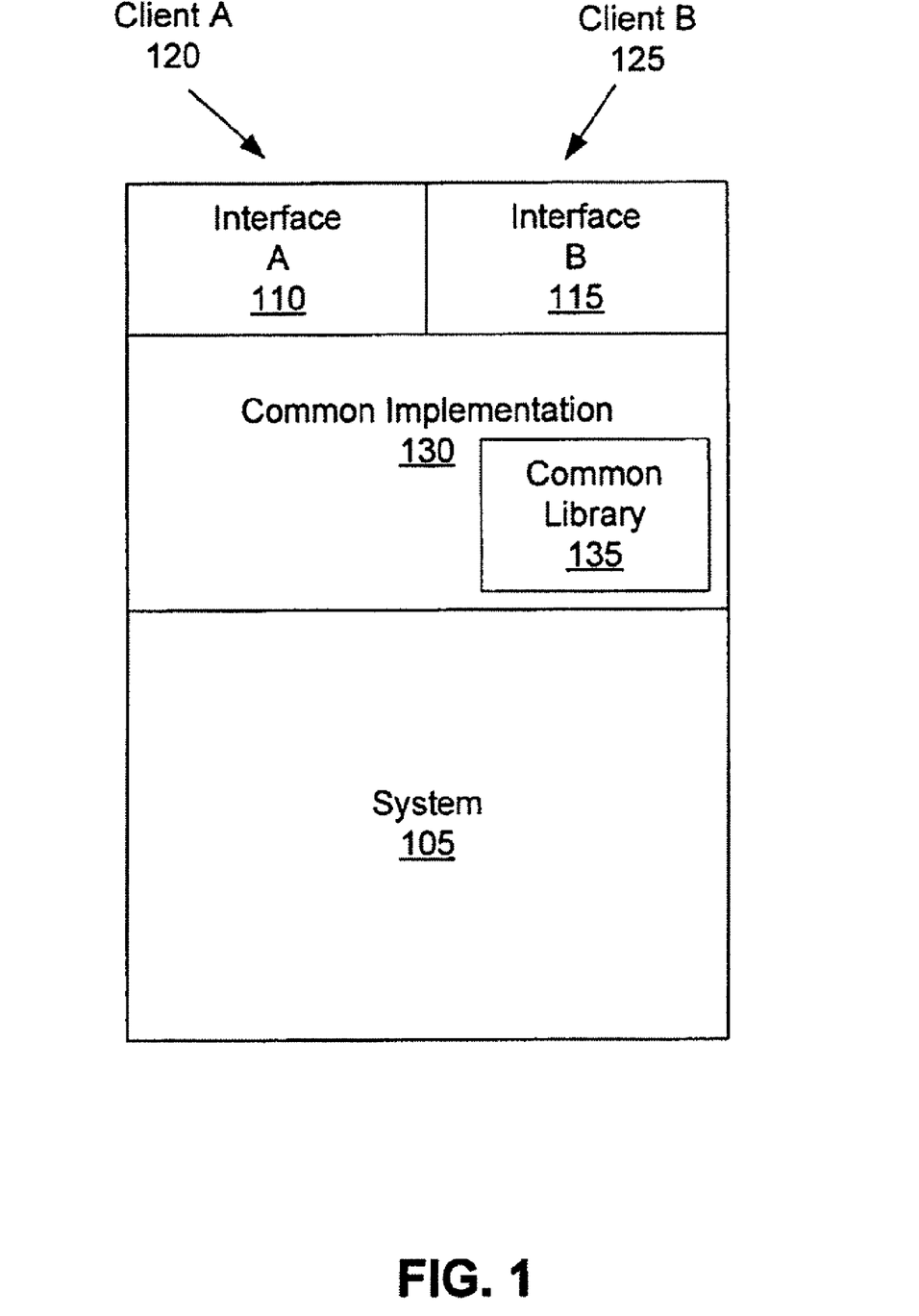
FIG. 1 illustrates multiple interfaces to a system in an embodiment of the invention.

FIG. 1 illustrates multiple interfaces to a system in an embodiment of the invention. In this illustration, a system 105 may be accessed through either a first interface, interface A 110 or a second interface, interface B 115. The system 105 may be any type of system that is accessed through an interface, including, but not limited to, a storage server. While FIG. 1 illustrates two interfaces, any number of interfaces may be implemented using an embodiment of the invention. As illustrated, a first client 120 is accessing the system 105 via the first interface and a second client 125 is accessing the system 105 via the second interface 115, which may include access via a management console or other process. The interfaces may vary in properties, including variances in command names, command types and structures, and other factors.

In one embodiment of the invention, the first interface 110 and the second interface 115 share a common interface implementation 130. The common interface implementation 130 is used for commands from both interfaces. In one embodiment, the common interface implementation 130 is used to recognize and parse commands from both interfaces. In one embodiment of the invention, the common interface implementation includes a common library 135, the common library including a set of common opcodes to be used to implement commands for all of the interfaces to the system 105.

Figure 2:
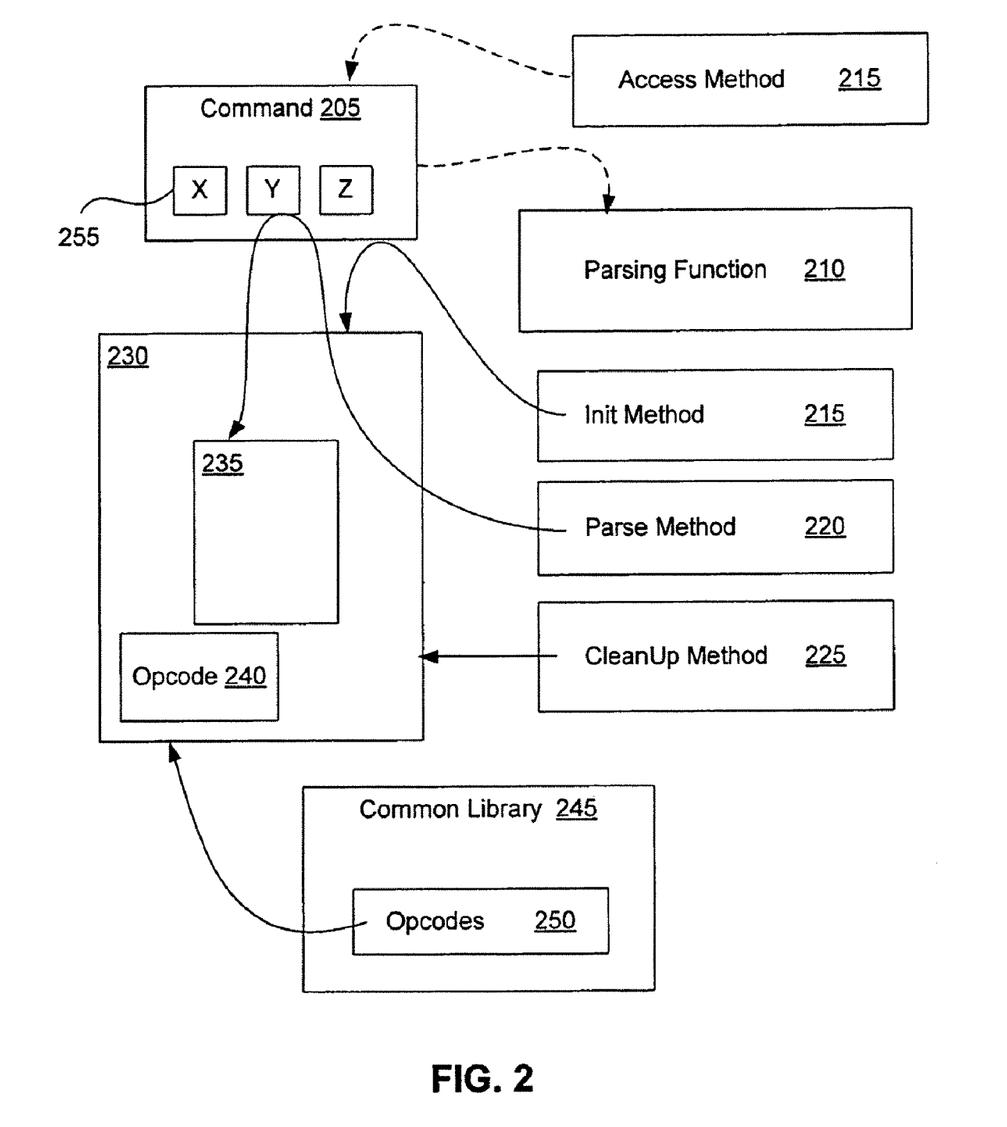
FIG. 2 illustrates an embodiment of a shared implementation of multiple interfaces to a system.

FIG. 2 illustrates an embodiment of a shared implementation of multiple interfaces to a system. In this illustration, a command 205 is received. The command 205 is a command for one of a number of different interfaces for the system. An access method 260 may be used to obtain information from the command 205. A parsing function 210 is provided for the command. In one embodiment, an appropriate parsing function is assigned for each command of each interface for the system.

The parsing function 210 may utilize various methods to parse the command 205. For example, the methods may include an initiation function ("init") 215, which generates a basic data structure (or parsing structure) 230, including a common parsing structure 235 to accept arguments 255 (shown as arguments X, Y, and Z) of the command 205. The basic data structure 230 may also include an opcode 240 for the operation to be performed, the opcode 240 being one of a common set of opcodes 250 obtained from a common library 245. The opcode 240 represents the operation to provided by command 205 and any other command for any of the interfaces to the system that is intended to perform the same operation.

The methods may further include a parsing method ("parse") 220 to perform the actual parsing of the elements of the command 205 and to fill in the common parsing structure 235, and thereby produce the parsing structure for the command. The methods may also include a method to clean up data ("clean up") 225 after command execution is completed.

Figure 3:
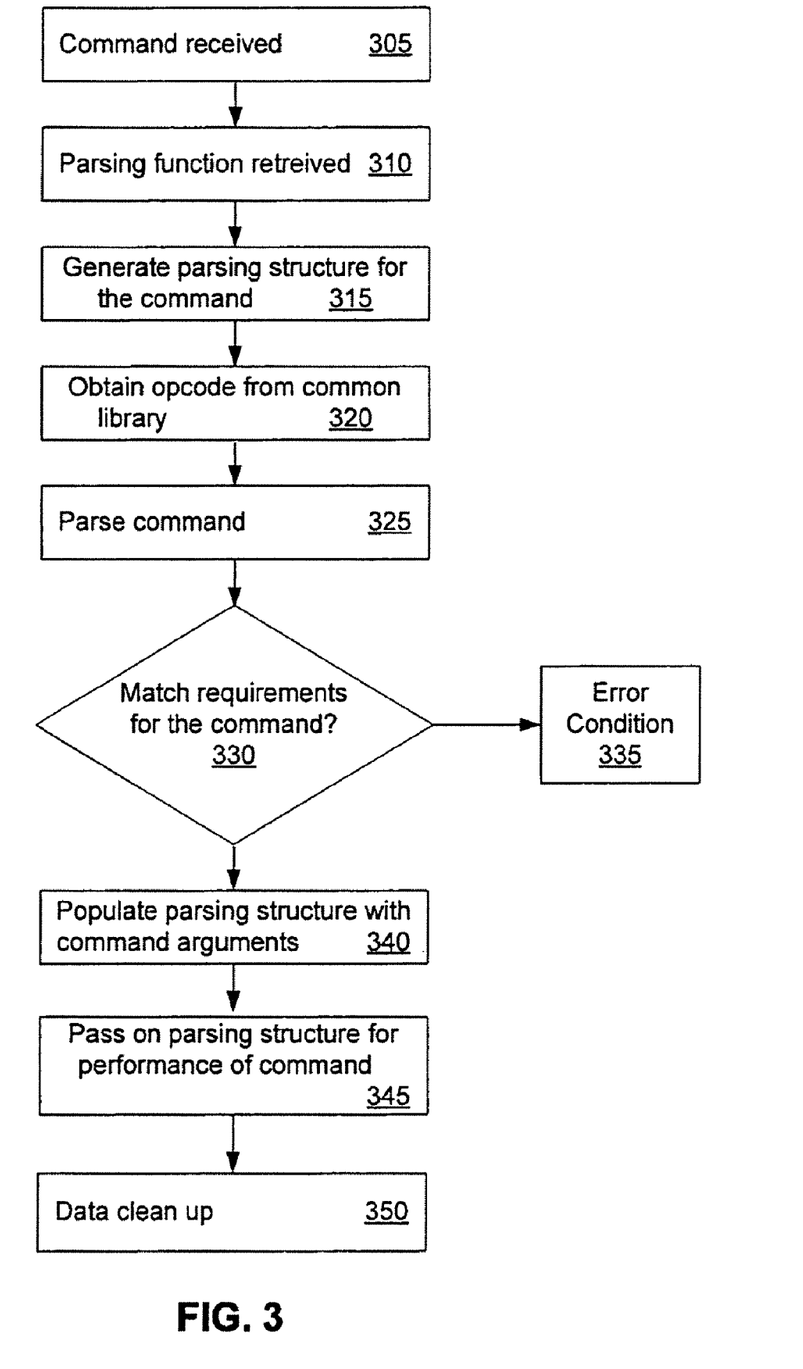
FIG. 3 is a flowchart illustrating an embodiment of implementation of multiple interfaces to a system.

FIG. 3 is a flowchart illustrating an embodiment of implementation of multiple interfaces to a system. In this example, a command for a particular interface to a system is received 305 and a parsing function for the command is retrieved 310. The parsing function is one of a set of parsing functions, with at least one of the parsing functions being associated with each command of each interface to the system.

A parsing structure for the command is generated 315 and is filled with basic information. An opcode from a common library of opcodes is provided for the command 320. The command is then parsed 325 to obtain the arguments for the command. The command may have certain fields that are optional and certain fields that are mandatory, depending on the nature of the command and the interface involved. If the command does not match the requirements for this command 330, an error condition is present 335, which may be inserted into the parsing structure for the command. Otherwise the data structure is populated with the data from the command 340. The parsing structure may then be passed on for the performance of the command 345. Any unneeded data may be cleaned up or deleted after the execution of the command 350.

Figure 4:
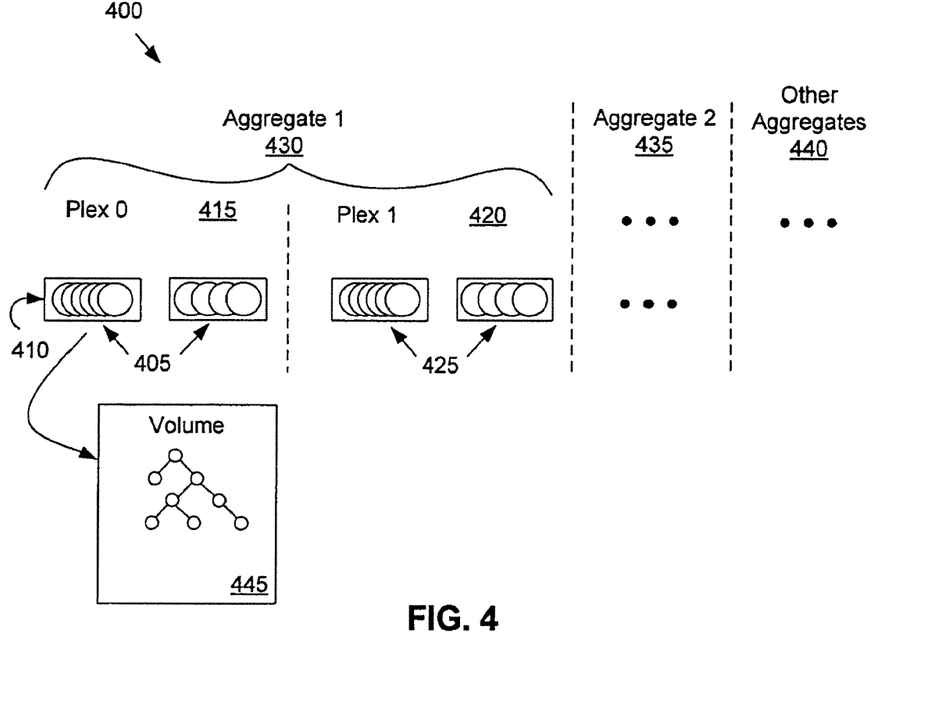
FIG. 4 is an illustration of data storage server that may be accessed using an embodiment of the invention.

FIG. 4 is an illustration of data storage server that may be addressed using an embodiment of the invention. An embodiment of the invention may be implemented in various environments, including for interfaces to a storage server. While FIG. 4 illustrates one form of a storage server, data storage may be implemented in many different forms.

In an embodiment, a system that implements the invention includes a number of RAID (redundant array of independent disks) groups, which each RAID group including some number of memory disks. The operation of the RAID groups may vary according to the specification for the RAID group. Standard specifications include RAID 1 for mirrored arrays, RAID 2 for parallel arrays with ECC (error checking and correction), RAID 3 for a parallel array with parity, RAID 4 for a striped array with parity, and RAID 5, for a striped array with rotating parity. Operations may further include RAID DP (dual or diagonal parity), providing additional protection. In one embodiment, a system that implements the invention utilizes RAID 4 or RAID DP, which are standards that protect against disk failure by computing parity information based on the contents of all of the disks in the array. A RAID 4 group includes a set of data disks and a parity disk that implements RAID 4, with RAID DP including a set of data disks and two parity disks. However, embodiments of the invention are not limited to these examples, and may be implemented using any RAID specification or other storage standard.

In an embodiment of the invention, a number of RAID groups may make up a group known as a plex, which is a collection of RAID groups. The use of plexes allows for mirroring a RAID group, with a mirror being a copy of the data from the RAID. One or two plexes together, depending on whether a mirror exists, form an aggregate. An aggregate is a RAID protected area that provides storage.

A volume is a logical construct for the organization of files. A volume exists within a certain number of RAID groups. A file server may include any number of volumes. In a first type of system or subsystem, aggregates and volumes are in a one-to-one relationship, each aggregate having one single volume. Any modification of the size of a volume thus requires that a disk be added. In this system, the smallest possible volume size is two disks for RAID 4 operations (with one disk containing data and a second disk containing parity information) or three disks for RAID DP operations (one disk containing data and two disks containing parity information). In a second type of system or subsystem, aggregates and volumes are not tied in a one-to-one relationship. Instead, an aggregate may contain multiple volumes, and the volumes may be adjusted in size in smaller increments. In the second type of system, "cloning" of volumes in an aggregate is possible, with a clone in this context being a snapshot of a volume.

In this illustration, a storage server 400 provides storage in the form of, for example, a number of different RAID groups 405. Each RAID group includes one or more disks 410. A number of RAID groups 405 form a plex 415, shown as plex 0. The plex 415 is a part of an aggregate 1 430. The aggregate may be mirrored or unmirrored, with a mirror being a copy. If aggregate 1 430 is mirrored, then it also includes plex 1. The storage server 400 may also include other aggregates, shown as aggregate 2 435 and other aggregates 440, which would contain their own data storage disks.

Aggregate 1 430 may include a volume 445, with a volume being a logical unit of storage. A traditional volume is coextensive with the aggregate, the aggregate containing one volume. Any modification in the size of a traditional volume requires an increase in the size of the RAID groups 405 making up the aggregate. A flexible volume is a different type of volume that can be of varying size and that is not required to be in a one-to-one relationship with an aggregate. Instead, an aggregate can contain multiple flexible volumes. In an embodiment of the invention, the storage server 400 may include traditional volumes, flexible volumes, or both.

In one embodiment, the storage server 400 receives commands via multiple interfaces. For example, the multiple interfaces may include a first interface that is a command line interface and a second interface that is an API. The commands may include operations regarding memory structures, including the creation or destruction of aggregates and volumes.

In one embodiment of the invention, the commands for the interfaces to the storage server are implemented with a common interface implementation. The commands for the operations may vary and thus are detected and parsed by the common interface implementation. For example, a first interface may be a command line interface that utilizes a command "vol create volname" with a first set of arguments to create a new volume. A second interface may be an API that utilizes a command "volume-create" with a second set of arguments to create a new volume, the first set of arguments and the second set of arguments possibly containing different elements. The common interface implementation maps both of the commands to a common structure that can be used to create volumes.

Figure 5:
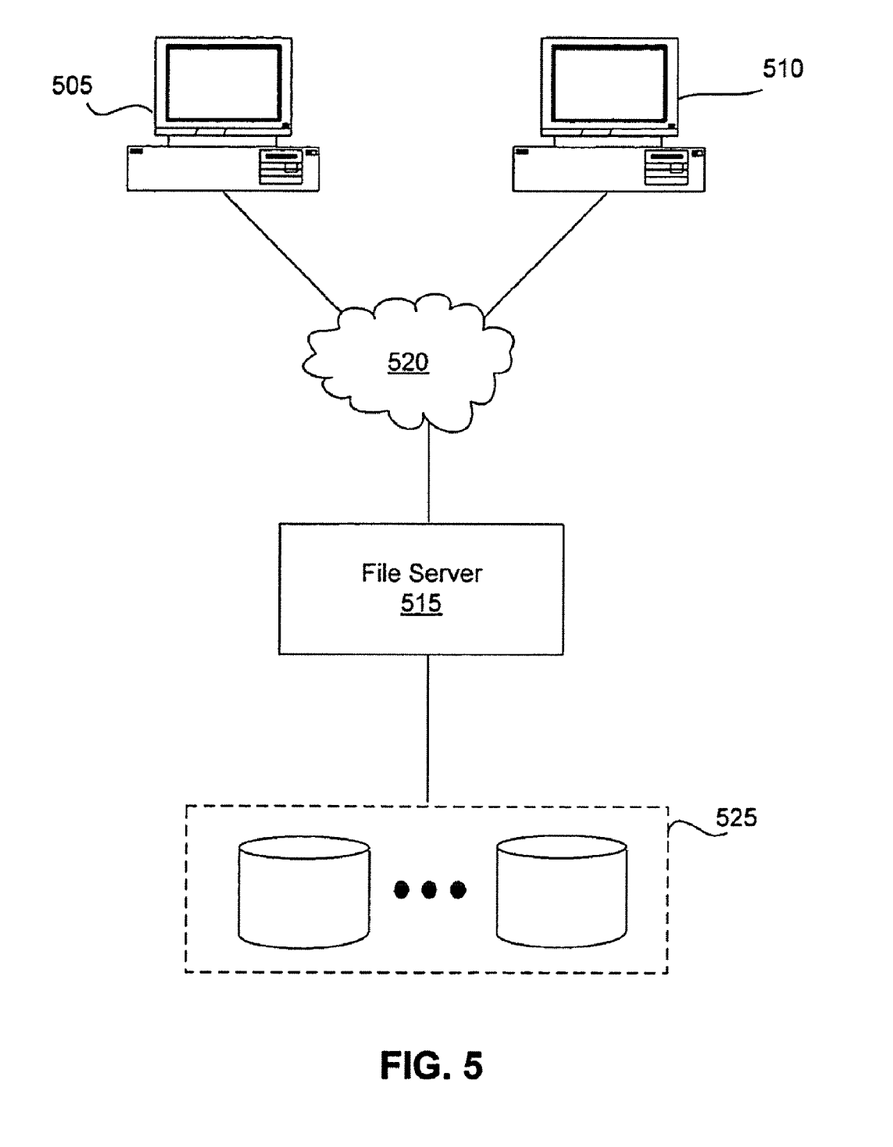
FIG. 5 illustrates a network environment that includes a file server that implements an embodiment of the invention.

An embodiment of the invention may be implemented in a storage server, such as a file server. FIG. 5 illustrates a network environment that includes a file server that implements an embodiment of the invention. However, a shared implementation for multiple system interfaces is not limited to use in traditional file servers, or to use in storage servers at all, for that matter. For example, embodiments of the invention may be implemented in various other types of systems that utilize multiple interfaces.

A file server 515 shown in FIG. 5 is coupled locally to a storage subsystem 525, which includes a set of mass storage devices, and to a set of clients, shown as a first client 505 and a second client 510, through a network 520, such as a local area network (LAN). Each of the clients may be, for example, a conventional personal computer (PC), workstation, or the like. The storage subsystem 525 is managed by the file server 515. The file server 515 receives and responds to various read and write requests from the clients that are directed to data stored in or to be stored in the storage subsystem 525. The mass storage devices in the storage subsystem 525 may be, for example, conventional magnetic disks, optical disks such as CD-ROM or DVD based storage, magneto-optical (MO) storage, or any other type of non-volatile storage devices suitable for storing large quantities of data.

The file server 515 may have a distributed architecture; for example, it may include a separate N- ("network") blade and D- ("disk") blade (not shown). In such an embodiment, the N-blade is used to communicate with clients 505 and 510, while the D-blade includes the file system functionality and is used to communicate with the storage subsystem 525. The N-blade and D-blade communicate with each other using an internal protocol. Alternatively, the file server 515 may have an integrated architecture, where the network and data components are all contained in a single box. The file server 515 further may be coupled through a switching fabric to other similar file servers (not shown) that have their own local storage subsystems. In this way, all of the storage subsystems can form a single storage pool, to which any client of any of the file servers has access.

In an embodiment of the invention, the first client 505 may utilize a first interface to control or manage operations for data contained in the storage subsystem 525 through the file server 515. In one possible example, the first client 505 utilizes a command line interface to communicate commands. In one possible example, the second client 510 utilizes an API to communicate commands. In an embodiment of the invention, the file server 515 supports the interface utilized by the first client 505 and the interface utilized by the second client 520 using a single implementation.

Figure 6:
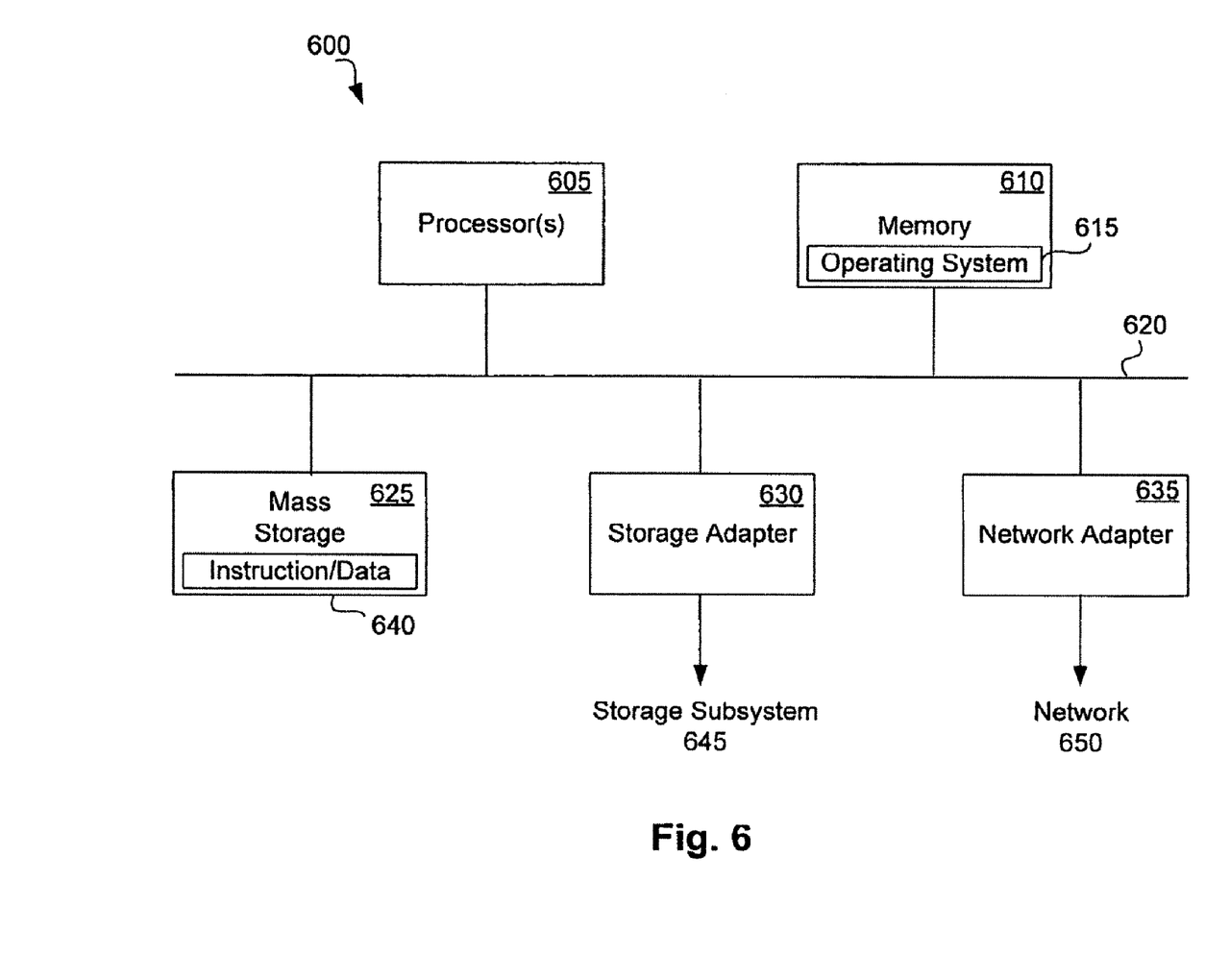
FIG. 6 is a block diagram illustrating an architecture of a file server that may implement an embodiment of the invention.

FIG. 6 is a block diagram illustrating an architecture of a file server that may implement an embodiment of the invention. Certain standard and well-known components that are not germane to the present invention may not be shown. A file server 600 includes one or more processors 605 and memory 610 coupled to a bus system 620. The bus system 620 shown in FIG. 2 is an abstraction that represents any one or more separate physical buses, point-to-point connections, or both connected by appropriate bridges, adapters, or controllers. The bus system 620, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

The processors 605 are the central processing units (CPUs) of the file server 600 and, thus, control the overall operation of the file server 600. In certain embodiments, the processors 605 accomplish this by executing software stored in memory 610. A processor 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 610 is or includes the main memory of the file server 600. Memory 610 represents any form of random access memory (RAM), read-only memory (ROM), flash memory, or the like, or a combination of such devices. Memory 610 stores, among other things, the operating system 615 of the file server 600.

Also connected to the processors 605 through the bus system 620 are one or more internal mass storage devices 625, a storage adapter 630 and a network adapter 635. Internal mass storage devices 625 may be or include any conventional medium for storing large volumes of instructions and data 640 in a non-volatile manner, such as one or more magnetic or optical based disks. The storage adapter 630 allows the file server 600 to access a storage subsystem 645 and may be, for example, a Fibre Channel adapter or a SCSI adapter. The network adapter 635 provides the file server 600 with the ability to communicate with remote devices, such as the clients 405 and 410 illustrated in FIG. 4, over a network 650 and may be, for example, an Ethernet adapter.

Figure 7:
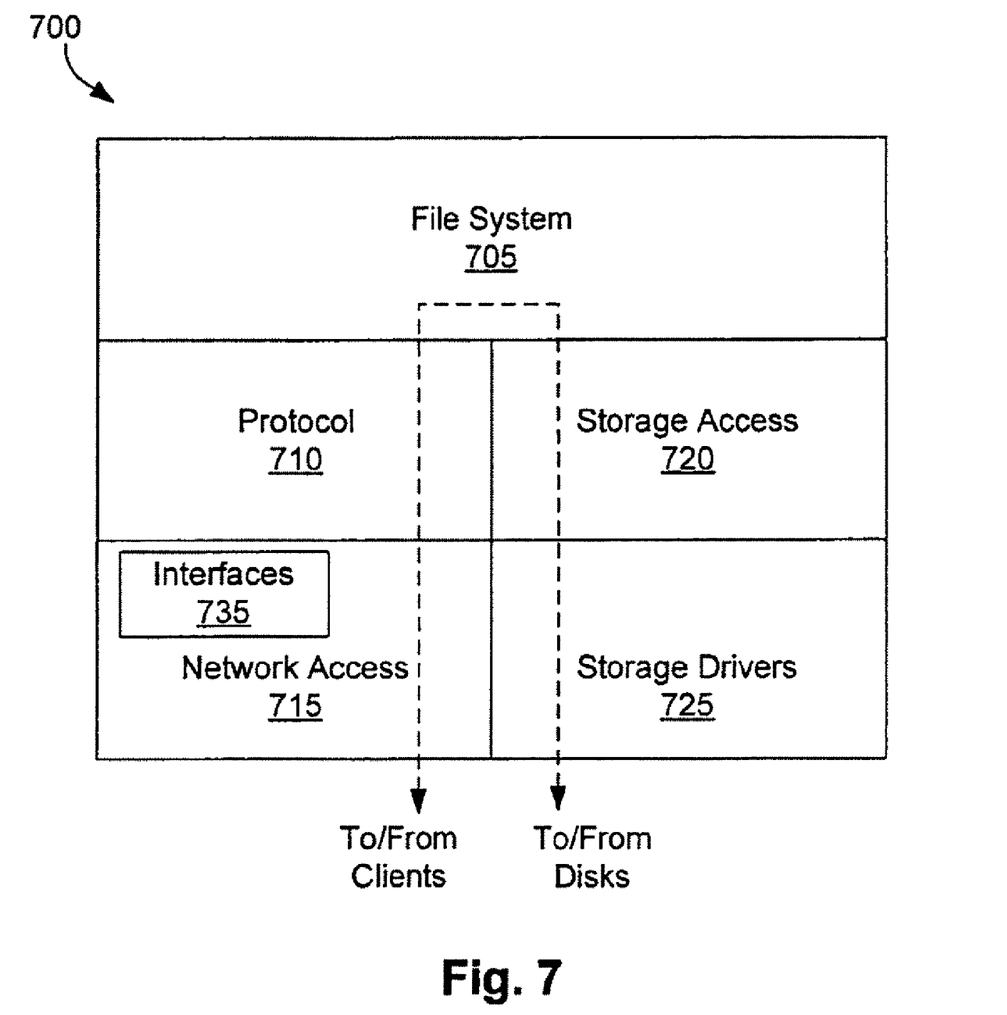
FIG. 7 is a block diagram showing an operating system of a file server according to an embodiment of the invention.

FIG. 7 shows an example of an operating system of a file server according to an embodiment of the invention. As shown, an operating system 700 includes several modules, or "layers". These layers include a file system 705. The file system 705 is application-layer software that keeps track of the directory structure (hierarchy) of the data stored in a storage subsystem and manages read/write operations on the data (i.e., executes read/write operations on the disks in response to client requests). Logically "under" the file system 705, the operating system 700 also includes a protocol layer 710 and an associated network access layer 715, to allow a file server to communicate a network, such as clients. The protocol 710 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 715 includes one or more drivers that implement one or more lower-level protocols to communicate over the network, such as Ethernet. The network access layer 715 may incorporate multiple interfaces 735. In one embodiment of the invention, the multiple interfaces 735 are supported by a single common implementation.

Also logically under the file system 705, the operating system 700 includes a storage access layer 720 and an associated storage driver layer 725, to allow a file server to communicate with a storage subsystem. The storage access layer 720 implements a higher-level disk storage protocol, such as RAID, while the storage driver layer 725 implements a lower-level storage device access protocol, such as Fibre Channel Protocol (FCP) or SCSI. To facilitate description, it is henceforth assumed herein that the storage access layer 720 implements a RAID protocol, such as RAID 4 or RAID DP, and therefore may alternatively be referred to as RAID layer 720. Also shown in FIG. 7 is path 730 of data flow through the operating system 700 associated with a read or write operation.

Thus, a method and apparatus for shared implementation for multiple system interfaces have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    receiving, by a common interface implementation, a command from one of a plurality of interfaces to perform an operation on a system, wherein the common interface implementation is operatively coupled to the plurality of interfaces, and wherein the common interface implementation performs centralized processing of commands received from any of the plurality of interfaces, each of the plurality of interfaces supporting a different command structure for performing said operation;
    generating, by the common interface implementation, a parsing structure for the command, the parsing structure including an opcode from a common library, the opcode being associated with said operation, wherein the common library is located within the common interface implementation;
    parsing, by the common interface implementation, the command to fill in the parsing structure using one of a plurality of parsing functions, the parsing of the command including inserting an argument from the command into the parsing structure for the command; and
    performing the operation based on the opcode and the parsing structure.

2. The method of claim 1, wherein generating the parsing structure for the command comprises inserting basic information regarding the command into the parsing structure.

3. The method of claim 1, further comprising performing an access function to obtain information from the command.

4. The method of claim 1, wherein parsing the command comprises extracting the arguments from the command and inserting the arguments into the parsing structure for the command.

5. The method of claim 1, wherein at least one parsing function of the plurality of parsing functions is associated with each command of each of the plurality of interfaces.

6. The method of claim 1, further comprising cleaning up unneeded data after the execution of the command.

7. A system comprising:
    a first interface to access the system;
    a second interface to access the system;
    a common interface implementation to perform centralized processing of commands received from both the first interface and the second interface, wherein the common interface implementation is operatively coupled to the first interface and the second interface, and wherein a first command of the first interface and a second command of the second interface perform a common operation on the system, the first command is different from the second command, and the common operation is selected from a set of operations; and
    a library to support the common interface implementation in parsing of a command received from the first interface or the second interface, wherein the library is located within the common interface implementation and provides a separate opcode associated with each of the set of operations, and wherein the parsing of the command includes generating a parsing structure for the command, the parsing structure including an opcode from the library.

8. The system of claim 7, wherein a command for the first interface is not supported by the second interface.

9. The system of claim 7, wherein a command for the first interface provides the same function as a plurality of commands for the second interface.

10. The system of claim 9, wherein the library contains a set of opcodes for all commands of the first interface and the second interface.

11. The system of claim 9, wherein the library contains a set of parsing functions, at least one parsing instruction being associated with each command for the first interface and the second interface.

12. The system of claim 7, wherein the common interface implementation comprises a set of implementation methods for use in parsing any command for the first interface or the second interface.

13. The system of claim 7, wherein the system comprises a storage system.

14. The system of claim 7, wherein a client manages the system via the first interface or the second interface.

15. The system of claim 7, wherein the first interface is a command line interface.

16. The system of claim 15, wherein the second interface is an application programming interface (API).

17. A storage server comprising:
    a processor;
    a network adapter coupled with the processor, through which to communicate with a set of one or more clients;
    a storage adapter coupled with the processor, through which to access a set of one or more mass storage devices;
    a command line interface to enable a remote processing system to access the storage server;
    an application programming interface (API) to enable a remote processing system to access the storage server;
    a unified interface system to perform centralized processing of commands received from either the command line interface or the API, the unified interface system operatively coupled to the command line interface and the API, wherein the unified interface system parses commands from both the command line interface and the API, wherein a first command of the command line interface and a second command of the API perform a common operation selected from a set of operations on the system, the first command being different from the second command; and
    a library to support the common interface implementation in parsing of a command received from the command line interface or the API, wherein the library is located within the common interface implementation and provides a separate opcode associated with each of the set of operations, and wherein the parsing of the command includes generating a parsing structure for the command, the parsing structure including an opcode from the library.

18. The storage server of claim 17, further comprising a set of parsing functions, one or more of the parsing functions being associated with each command of the command line interface and each command of the API.

19. The storage server of claim 17, further comprising one or more implementation methods, the implementation methods to provide for parsing operations for each command of the command line interface and each command of the API.

20. The storage server of claim 17, further comprising a storage subsystem coupled with the storage server.

21. The storage server of claim 20, wherein a client may utilize the command line interface or the API to manage the storage subsystem.

22. A machine-readable storage medium embedded with a computer executable program including instructions that, when executed by a processor, cause the processor to perform operations comprising:

receiving, by a common interface implementation, a command from one of a plurality of interfaces to perform an operation on a system, wherein the common interface implementation is operatively coupled to the plurality of interfaces, and wherein the common interface implementation performs centralized processing of commands received from the plurality of interfaces, each of the plurality of interfaces supporting a different command structure for performing said operation;

generating, by the common interface implementation, a parsing structure for the command, the parsing structure including an opcode from a common library, the opcode being associated with said operation, wherein the common library is located within the common interface application;

parsing, by the common interface application, the command to fill in the parsing structure using one of a plurality of parsing functions, parsing of the command including inserting an argument from the command into the parsing structure for the command; and performing the operation based on the opcode and the parsing structure.

23. The medium of claim 22, wherein generating the parsing structure for the command comprises inserting basic information regarding the command into the parsing structure.

24. The medium of claim 22, further comprising instructions that, when executed by the processor, cause the processor to perform operations comprising:

performing an access function to obtain information from the command.

25. The medium of claim 22, wherein parsing the command comprises extracting the arguments from the command and inserting the arguments into the parsing structure for the command.

26. The medium of claim 22, wherein at least one parsing function of the plurality of parsing functions is associated with each command of each of the plurality of interfaces.

27. The medium of claim 22, further comprising instructions that, when executed by the processor, cause the processor to perform operations comprising:

cleaning up unneeded data after the execution of the command.

28. A method of operating a network storage server, the method comprising:

receiving, at a common interface implementation of the network storage server, a command from an interface to perform an operation on a storage system, wherein the interface is one of a plurality of interfaces for the storage system, wherein the common interface implementation is operatively coupled to the plurality of interfaces, and wherein the common interface implementation performs centralized processing of commands received from any of the plurality of interfaces, and wherein each of the plurality of interfaces supports a different command for performing said operation;

parsing, by the common interface implementation of the network storage server, the command to identify an opcode for said operation using a parsing function associated with the command and the interface, wherein the opcode is selected from a common library that is located within the common interface implementation;

constructing, by the common interface implementation of the network storage server, a parsing structure for the command by inserting arguments from the command into the parsing structure;

upon the parsing structure being filled in by said constructing of the parsing structure, performing, by the network storage server, said operation based on the opcode and the parsing structure; and cleaning-up, by the common interface implementation of the network storage server, the opcode and the parsing structure upon completion of the said operation.

* * * * *